(12) United States Patent
Trewiler (10) Patent No.: US 6,994,920 B2
(45) Date of Patent: Feb. 7, 2006

(54) FUSION WELDING METHOD AND WELDED ARTICLE

(75) Inventor: Gary Edward Trewiler, Loveland, OH (US)

(73) Assignee: General Electric Company, Schenectady, NY (US)

( * ) Notice: Subject to any disclaimer, the term of this patent is extended or adjusted under 35 U.S.C. 154(b) by 126 days.

(21) Appl. No.: 10/699,405

(22) Filed: Oct. 31, 2003

(65) Prior Publication Data

US 2005/0092717 A1 May 5, 2005

(51) Int. Cl.
*B32B 15/01* (2006.01)
*B23K 28/00* (2006.01)

(52) U.S. Cl. .................. 428/670; 428/666; 428/667; 428/678; 428/686; 428/926; 428/934; 29/889.1; 219/76.13; 219/76.16; 219/136; 228/119; 228/196; 228/197; 228/218; 228/234.1; 228/262.3; 228/262.4; 228/262.6

(58) Field of Classification Search ................ 428/670, 428/666, 667, 678, 686, 926, 934; 29/889.1; 219/76.13, 76.16, 136; 228/119, 196, 197, 228/218, 234.1, 262.3, 262.4, 262.6
See application file for complete search history.

(56) References Cited

U.S. PATENT DOCUMENTS

| | | | |
|---|---|---|---|
| 4,305,697 A | 12/1981 | Cohen et al. | |
| 4,657,171 A | 4/1987 | Robins | |
| 4,808,055 A | 2/1989 | Wertz et al. | |
| 5,183,390 A | 2/1993 | Amos | |
| 5,794,338 A | 8/1998 | Bowden, Jr. et al. | |
| 6,042,880 A | 3/2000 | Rigney et al. | |
| 6,084,196 A | 7/2000 | Flowers et al. | |
| 6,384,365 B1 * | 5/2002 | Seth et al. | 219/76.13 |
| 6,575,702 B2 | 6/2003 | Jackson et al. | |
| 6,610,962 B1 | 8/2003 | Warren et al. | |
| 2003/0082048 A1 | 5/2003 | Jackson et al. | |

FOREIGN PATENT DOCUMENTS

| | | |
|---|---|---|
| EP | 1018388 | 7/2000 |
| EP | 1319462 | 5/2004 |
| EP | 1416063 | 5/2004 |

* cited by examiner

Primary Examiner—Robert R. Koehler
(74) Attorney, Agent, or Firm—Janice B. Whitlow; Lee H. Sachs (57) ABSTRACT

A fusion welding method is provided for fusion welding at juxtaposed interface surfaces a first member, for example made of a first metal based on at least one of Ru, Rh, Pd, and Pt, with a second member made of a second metal, for example a high temperature alloy based on at least one of Fe, Co, and Ni, including at least one identified element, for example Al, that can form a continuous layer of a brittle intermetallic compound with the first metal that is free of such element. With the interface surfaces disposed in contact, energy is generated at the interface surfaces in a combination of an amount and for a first time selected to be sufficient to heat the interface surfaces to a fusion welding temperature. However, the first time is less than a second time that enables formation at the fusion welding temperature of the continuous layer of the brittle intermetallic compound at the interface surfaces. A welded article is provided with a fusion weld free of such continuous layer of the brittle intermetallic compound.

26 Claims, 5 Drawing Sheets

FUSION WELDING METHOD AND WELDED ARTICLE

BACKGROUND OF THE INVENTION

This invention relates to fusion-type welding of members made of different, dissimilar alloys and, more particularly, to such welding of alloys at least one of which includes an element that can form a substantially continuous layer of a brittle, low ductility intermetallic compound in a resulting weld.

Power generating apparatus, for example gas turbine engines, includes, in the hotter operating sections such as the turbine section, components made of high temperature alloys based on at least one of the elements Fe, Co, and Ni. Sometimes called superalloys, a typical example of frequently used superalloys is the Ni-based superalloy that can included alloying elements for a variety of purposes including precipitation strengthening, solid solution strengthening, and/or high temperature environmental resistance. An example of one of such elements of particular interest to the present invention is Al included in Ni base superalloys at least for high temperature oxidation resistance and in some alloys for precipitation strengthening generally in amounts in the range of about 2–8 weight percent.

One type of turbine section component made of a Ni-base superalloy is an air cooled turbine blade described in U.S. Pat. No. 5,387,085—Thomas, Jr. et al. Generally, such a turbine blade includes at its radially outer end a radially outwardly extending rib, sometimes called a "squealer" tip, about the airfoil periphery. During service operation of such a turbine blade made of a Ni-base superalloy commercially identified as Rene' N5 alloy and more fully described in U.S. Pat. No. 5,173,255—Ross et al., various types of service damage were observed. In one example, it was observed that the radially outer blade end or tip portion had been damaged apparently by hot gasses flowing over or across the blade tip and/or interference between the rotating blade tip and surrounding stationary structure. This general type of operating damage has been observed for many years in the gas turbine engine art and a variety of methods and turbine blade tip configurations have been reported. For example, one is described in U.S. Pat. No. 4,169,020—Stalker et al. Another example of operating damage is article surface or coating damage or wear observed on discrete outer airfoil surfaces or areas along which higher temperature engine products of combustion flow. Examples of such surfaces or areas are described in U.S. Pat. No. 6,042,880—Rigney et al., and U.S. Pat. No. 6,106,231—Brainch et al.

When such damage occurs to a turbine blade tip or end portion and/or to an airfoil surface, at least based on economic considerations it is better to repair the damage than to replace the blade. It has been recognized that high temperature alloys based on at least one of the noble metal elements Ru, Rh, Pd, and Pt offer great potential for extending the temperature resistance and operating life capabilities of portions of turbine engine turbine blades subject to at least one of oxidation, sulfidation, and fluid flow wear resistance. Attachment of such an alloy to a specific, discrete, distinct location on an article, responsive to operating conditions, to repair damage or to enhance the capability of the article to resist operating damage, can provide such extended operating capability. Required is a joining method that can accomplish such attachment.

A variety of reported methods currently used in the repair of turbine engine components, including turbine blades, for joining or welding of members or surface portions result in melting and fusion at juxtaposed, cooperating interfaces between existing and replacement alloys. Such methods, well known in the art, include those commonly referred to as ordinary fusion, plasma, laser and SWET welding methods. Such methods involve applying heat energy at the juxtaposed interface surface portions for a time sufficient to result in melting and intermixing of elements of the alloys being joined. Such intermixing has been observed to result in creation of a broader liquidus—solidus band that upon cooling can generate stresses that can, under some circumstances, lead to cracking. Such circumstances upon subsequent cooling that result cracking in certain metal or alloy combinations include the formation of a layer or film of a compound that effectively is substantially continuous.

High temperature alloys such as Ni-base superalloys include at least one element, typically Al, which can form relatively lower ductility compounds, sometimes with other elements. In some Ni base superalloys, such compounds are generated as desirable, distinct island precipitates that tend to strengthen the alloy, for example, precipitates of the $Ni_3(Al,Ti)$ type. However, formation of a substantially continuous layer or film of a low ductility intermetallic at a weld between joined surfaces of certain dissimilar metals and/or alloys has been observed to result in weld cracking, either upon cooling after welding or after subsequent heating of the weld. Generally, such an intermetallic is referred to in the art as a brittle intermetallic compound.

One combination of such dissimilar metals and alloys that can result in formation of such a substantially continuous, detrimental layer at a welded junction is the fusion of a Ni base superalloy including Al with a metal or alloy based on at least one of the noble elements Ru, Rh, Pd, and Pt. For example, review of the phase diagram for Al—Pt shows a variety of intermetallic compounds of Al and Pt starting at about 65 wt. % Pt and extending up to about 95 wt. % Pt at a temperature up to about 1600° C. Accordingly, fusion welding of such combinations for a time in which Pt and Al can produce a substantially continuous layer of a brittle intermetallic compound in the weld region can result in a weld failure. Cracks in the weld or its heat affected zone can form during or after welding, or as a result of heat treatment during subsequent manufacturing operations, or heating and cooling during service operation. Therefore, current, typical fusion-type welding methods were found to be undesirable for welding a Ni-base superalloy, for example the above identified Rene' N5 alloy including Al, to a high temperature noble metal or metal alloy not including Al, for example an alloy including nominally, in weight %, about 25 Pd, 34.5 Pt, 0.5 Zr and about 40 Rh. Forms of such alloys are more fully described in U.S. Pat. No. 6,575,702 B2. Cracking at the interface weld occurred as a result of the formation of a substantially continuous layer at least one brittle intermetallic compound of Al.

Provision of a fusion type welding method for rapidly joining different, dissimilar metals and/or alloys, that otherwise can form the above described substantially continuous brittle intermetallic layer with certain metal combinations, would enable use of metals or alloys based on noble elements to enhance operating resistance to high temperature environmental conditions. For example, one such known fusion type welding method that has been reported is a percussion arc welding method used for rapidly joining different metals at a juncture under pressure through application of a brief burst of electrical energy. Such a method has been used in the microelectronics field for the joining of dissimilar metals. Application and specific control and selection of materials and parameters of such percussion welding method so that it inhibits the extent of such detrimental interaction between elements of high temperature and noble metals or alloys during welding to avoid formation of a substantially continuous layer of brittle intermetallic compound would enable their effective joining to enhance operating life of an article such as manufactured for high temperature use in a turbine engine.

BRIEF SUMMARY OF THE INVENTION

The present invention relates to fusion welding a first member having a first interface surface with a second member having a second interface surface. The first and second interface surfaces are disposed in contact and fusion welded together. In one form of the present invention, the first member is made of a first metal substantially free of at least one identified element that can form a substantially continuous brittle intermetallic compound layer at such first surface. The second member is made of a second metal that includes the at least one identified element that can form such continuous layer. In one method form, energy is generated at the interface surfaces in a combination of an amount and for a time sufficient to heat the first and second interface surfaces to a fusion welding temperature. However, such heating is for a first time that is less than a second time which enables formation at the fusion welding temperature of the substantially continuous layer of the brittle intermetallic compound at the interface surfaces.

In another form, the present invention provides a welded article comprising a first member made of a first metal substantially free of any identified element that can form the substantially continuous layer of the brittle intermetallic compound with the first metal, and a second member made of a second metal that includes such an identified element. The first and second members are fusion welded together at a weld that is substantially free of a substantially continuous layer of at least one brittle intermetallic compound.

DETAILED DESCRIPTION OF THE INVENTION

Currently, weld repair of service damaged turbine blades made of high temperature superalloys such as Ni-base superalloys does not use high temperature metals or alloys based on the noble metals, for example Ru, Rh, Pd, and Pt. It has been observed that the combination of temperature and time at temperature of typical commercial fusion welding in the presence of at least one identified element in the superalloy, for example Al, has resulted in formation in the weld of an effectively substantially continuous thin layer of at least one brittle intermetallic compound that resulted in cracking of the weld and/or the weld heat affected zone adjacent the weld. However, such noble metals and their alloys offer great potential for extending the operating capability of turbine blades, particularly high pressure turbine blades, both as originally manufactured as well as in the repaired form. Forms of the present invention limit the time of interaction during interface fusion between cooperating interface surfaces of certain dissimilar metals to less than that time which enables formation of a substantially continuous layer of one or more brittle intermetallic compounds at the juncture of such surfaces.

As it relates to the present invention, fusion welding means providing energy to generate heat to enable joining or bonding of cooperating interface surfaces, also known as faying surfaces, in contact with one another. The heating is to a temperature and for a time that enables migration of elements between such cooperating interface surfaces. According to forms of the present invention, the time of such heating at such temperature is selected to avoid formation of a substantially continuous layer of an identified intermetallic compound at the interface surfaces. Typically, some forms of the resulting weld have the general appearance of a solid state weld or bond.

One embodiment of the present invention for such fusion welding without formation of a substantially continuous layer of brittle intermetallic compound at the weld area is a method for percussion arc fusion welding noble metals and their alloys to other alloys including at least one identified element than can form such detrimental layer during conventional fusion type welding. For example, current commercial fusion welding of a Pt member to the above identified Rene' N5 Ni base superalloy including the identified element Al nominally at about 6 wt. % resulted in the formation in the weld of a substantially continuous layer of a brittle intermetallic compound including platinum aluminide. As used herein, the phrase "continuous layer of a brittle intermetallic compound" is intended to mean a layer in the weld and/or in the weld heat affected zone that effectively is substantially continuous and that results in solidification cracking and/or loss of physical properties of the resulting weld/base metal system. In addition, as used herein the term "free" in respect to identified elements that can form such brittle intermetallic compound layer means the absence, other than minor insignificant amounts, of any such element in an amount that can form a sufficiently continuous layer of such compounds to result in weld cracking. Thus the substantially continuous layer of intermetallic compounds as it relates to the present invention is distinguished from the above discussed interspersed formation of similar compounds, for example of the $Ni_3(Al,Ti)$ type, included in some Ni based superalloys for strengthening. The detrimental nature of such continuous layer can increase with heating and time, for example as can be experienced by a gas turbine engine article during subsequent manufacturing processes or service operation.

The present invention will be more clearly understood by reference to the drawings. One embodiment of an assembly for the practice of one form of the method of the present invention is shown in the diagrammatic fragmentary view of FIG. 1. The assembly shown generally at 20, maintained in position by appropriate ordinary commercially used tooling (not shown), comprises a first member 22, including a first interface surface 24. First member 22 is made of an electrically conductive first metal based on at least one of the elements Ru, Rh, Pd and Pt, in this specific example the above identified Ru 60 alloy. A second member 26, including a second interface surface 28, is disposed in spaced-apart juxtaposition with first member 22 across a gap 30 therebetween so that the interface surface surfaces 24 and 28 face one another. Second member 26 is made of an electrically conductive second alloy that includes at least one identified element that can form a substantially continuous layer of a brittle intermetallic compound with the first metal. For example, in this specific embodiment, the second alloy was the above identified Ni base superalloy Rene' N5 that included the identified element Al that can form such a brittle intermetallic compound layer with the Ru 60 alloy, free of that element. Other elements in Rene' N5 Ni base superalloy can form similar brittle intermetallic compounds but at a slower rate than does Al.

Figure 1:
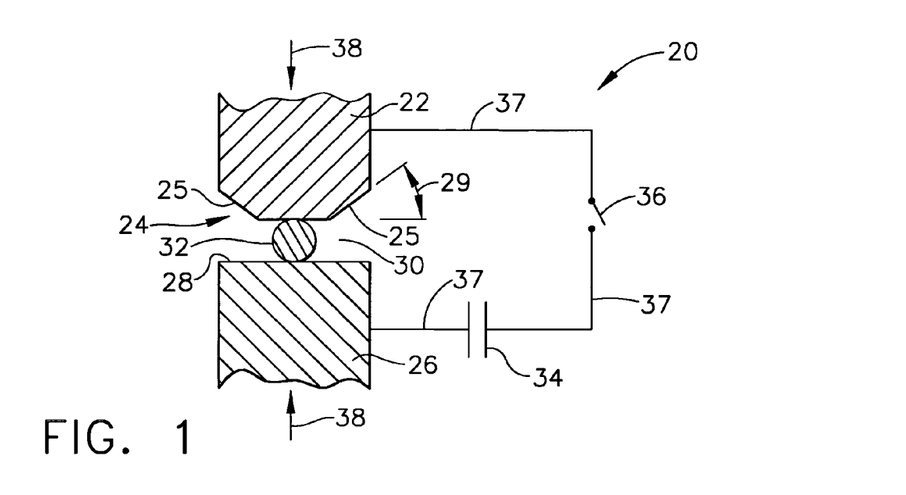
FIG. 1 is a diagrammatic fragmentary view of an assembly of the first and second members with an ignition member, in one schematic view of apparatus for practice of the method of the present invention.

In the embodiment of FIG. 1, interface surface 24 of first member 22 is provided with an outer edge portion 25 that diverges at an angle 29 away from surface 28 of second member 26. Such relief is provided to allow a plasma jet, described below, to exit gap 30 during practice of a form of the present method. For example, such an angle was in the range no greater than about 10°, more specifically about 3–6°.

Disposed in gap 30 between interface surfaces 24 and 28 is at least one ignition member 32 made of an electrically conductive third metal or alloy compatible with both the first metal and second alloy and that is free of such identified element. For example, ignition member 32 for compatibility with the first and second members of this example can be made of a metal or alloy based on at least one of the elements Ru, Rh, Pd and Pt, or can be the same metal, such as Ni, on which the first member is based. In this embodiment, ignition member 32 was a member separate and distinct from first and second members 22 and 26. However, one or more ignition members can be integral with or a part of either or both the first and second members provided such ignition members are free of any identified element that can form a brittle intermetallic compound with the second member.

Connected between first member 22 and second member 26 are components of an electric circuit that included an energy means represented by capacitor 34, powered by a typical electric source (not shown), for example from a commercial capacitive discharge welder. Such apparatus was capable of providing a selected flow of electrical energy as a brief burst in an amount sufficient to vaporize ignition member 32 into a plasma jet but for a first time, for example for no greater than about 10 microseconds, less than a second time, for example less than about one second, which will enable formation of the substantially continuous layer of a brittle intermetallic compound at interface surfaces 24 and 28. The electric circuit also comprised electric switch 36 and circuit wiring 37.

Associated with assembly 20 is a force means, represented by arrows 38, sufficient to press first and second interface surfaces 24 and 28 toward and into contact with ignition member 32 to provide or complete an electrical conductive path through first member 22, ignition member 32 and second member 26. Force means 38 can be applied to either the first or second members, the other member being held fixed, or can be applied to both members. The amount of force applied is at least sufficient to provide the electrical contact, preferably without excessive or any deformation of surfaces of the members.

During evaluation of the method form of the present invention, with the above-described embodiment of specific members in the assembly and circuit shown in FIG. 1, an electric power generating source from a commercial 6 kilojoule capacitive discharge welder provided flow of electrical energy at a potential of about 3000 volts to charge a 1200 microfarad capacitor 34. With the assembled members in position with force means 38 at about a 600 pound spring pre-load completing the electric circuit, switch 36 was closed. Capacitor 34 discharged a brief burst flow of electrical energy at an output of about 180,000 amps for a first time of about 6 microseconds, in the preferred range of no greater than about 10 microseconds, and of less than a second time in the range of about 500 milliseconds to one second duration. Such combination avoided heating interface surfaces 24 and 28 for a time that can enable formation of a substantially continuous layer of a brittle intermetallic compound at a resulting weld.

The flow of electric energy passing through ignition member 32 was sufficient to vaporize the material of ignition member 32 into a plasma jet that contacted and cleaned or removed surface contaminants from interface surfaces 24 and 28. Divergence of outer portion 25 of interface surface 24 at angle 29 with interface surface 28 enabled the plasma jet, that provided a medium for an electric arc to pass between such interface surfaces, to exit gap 30. Concurrently, the electric arc locally heated such interface surfaces to a bonding temperature while force 38 pressed the cleaned, juxtaposed interface surfaces into intimate contact at a force level, preferably with little or no upsetting, sufficient to weld the interface surfaces with a fusion weld that was so narrow that it had the appearance of a solid state weld. Because the application of electrical energy was sufficiently intense to fusion weld the members together but very brief, the cooling rate at the weld was rapid, for example in excess of $10^5$ degrees Kelvin per second. Such rapid cooling reduced the possibility of formation of the undesirable substantially continuous layer of brittle intermetallic compounds at the weld.

Resulting from practice of such method was an article, according to an embodiment of the present invention, including a fusion-type weld having a very narrow heat affected zone of no greater than about 10 mils, in the above example no greater than about one mil. Such very narrow heat affected zone was generated in such a brief time, in this example no greater than about 10 microseconds, that avoided or inhibited formation of identified brittle intermetallic compounds, for example ruthenium aluminide, the formation of which are time and temperature dependent. As is well known in the metallurgical art, a heat affected zone, sometime referred to as HAZ, adjacent a weld is the extent into a substrate at the weld in which local changes occur to the morphology or in the microstructure of the material as a result of exposure to certain levels of heat. For example, compound formation, precipitation, grain growth and/or change in grain size and hardness can occur.

Figure 2:
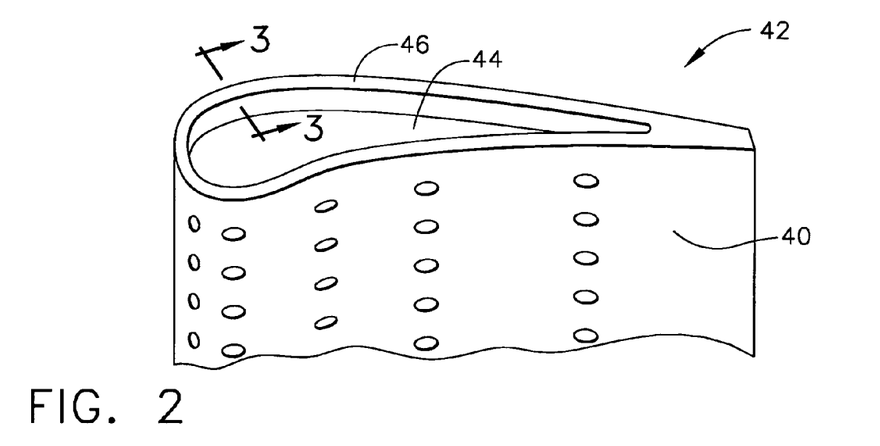
FIG. 2 is a diagrammatic, perspective fragmentary view of a turbine engine turbine blade radially outer portion.
Figure 3:
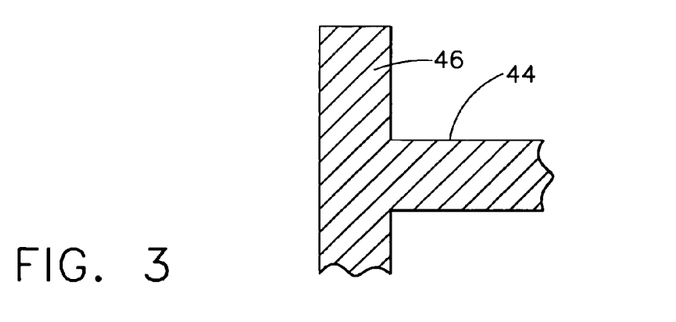
FIG. 3 is a fragmentary sectional view along 3—3 of the turbine blade tip portion of FIG. 2.

An application of the method form of the present invention is in the repair and enhancement of an article, for example a portion of turbine engine blading member. One example is a damaged tip portion or "squealer" tip of an air-cooled rotating gas turbine engine turbine blade, such as of the type and material identified and discussed above and shown in the diagrammatic, perspective fragmentary view of FIG. 2. The blade included an airfoil 40 terminating at a radially outer blade tip portion 42. Tip portion 42 comprised a plate 44 from which rib 46 extended radially outwardly, as is well known in the art. FIG. 3 is a fragmentary sectional view of tip portion 42 along lines 3—3 of FIG. 2.

Figure 4:
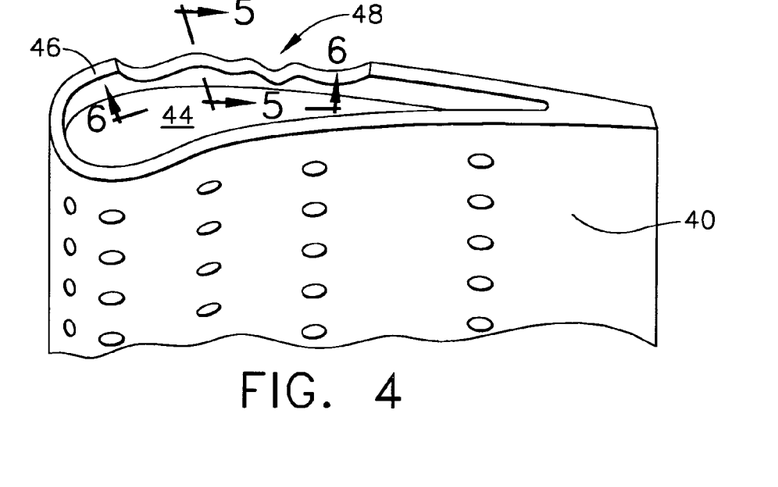
FIG. 4 is a diagrammatic, perspective fragmentary view of a turbine blade as in FIG. 2 showing a damaged tip portion.
Figure 5:
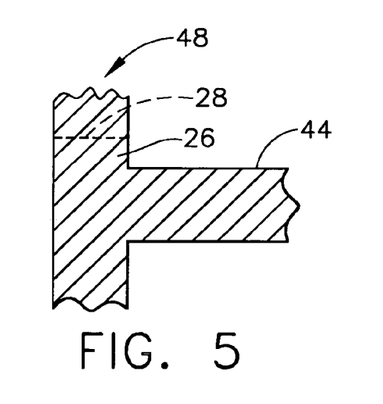
FIG. 5 is a fragmentary sectional view along 5—5 of the turbine blade tip portion of FIG. 4 showing the damaged tip portion
Figure 6:
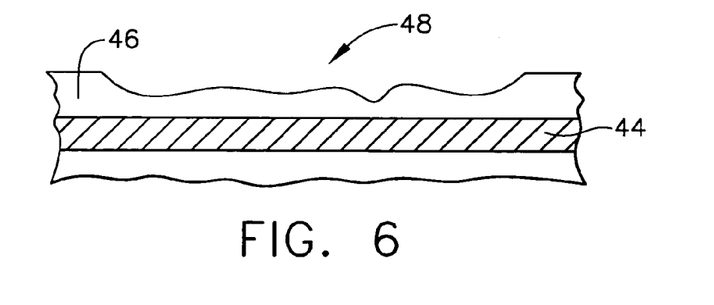
FIG. 6 is a fragmentary sectional view along lines 6—6 of the turbine blade tip portion of FIG. 4 showing another view of the damaged tip portion.
Figure 7:
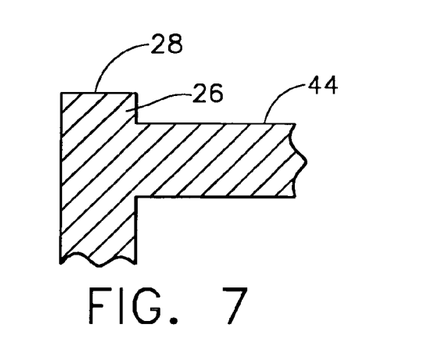
FIG. 7 is a sectional view as in FIG. 5 with the damaged tip portion removed.
Figure 8:
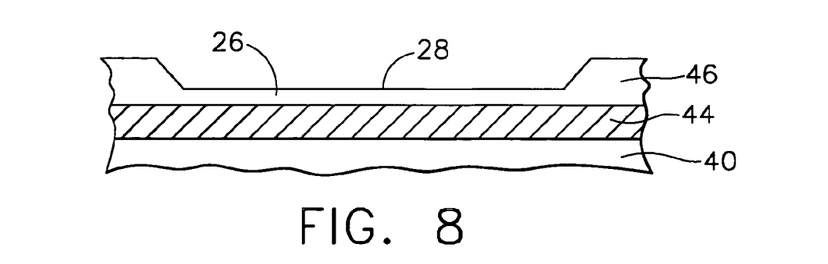
FIG. 8 is a fragmentary sectional view as in FIG. 6 with the damaged tip portion removed.

During engine service operation, it had been observed that damage to rib 46 can occur. Generally the damage occurred in selected locations as a result of interference with associated stationary components and/or of the flow pattern across tip 42 of hot gasses and products of combustion unique to the particular engine design and operation. One example of such damage to a gas turbine engine turbine blade made of the above identified Rene' N5 Ni base superalloy is shown generally at 48 in the diagrammatic, perspective fragmentary view of FIG. 4, in the fragmentary sectional view of FIG. 5 along lines 5—5 of FIG. 4, and in the fragmentary sectional view of FIG. 6 along lines 6—6 of FIG. 4.

Figure 9:
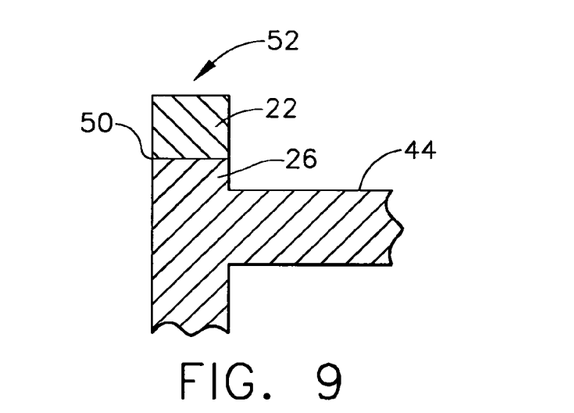
FIG. 9 is a sectional view of the structure of FIG. 7 with a welded replacement tip portion.
Figure 10:
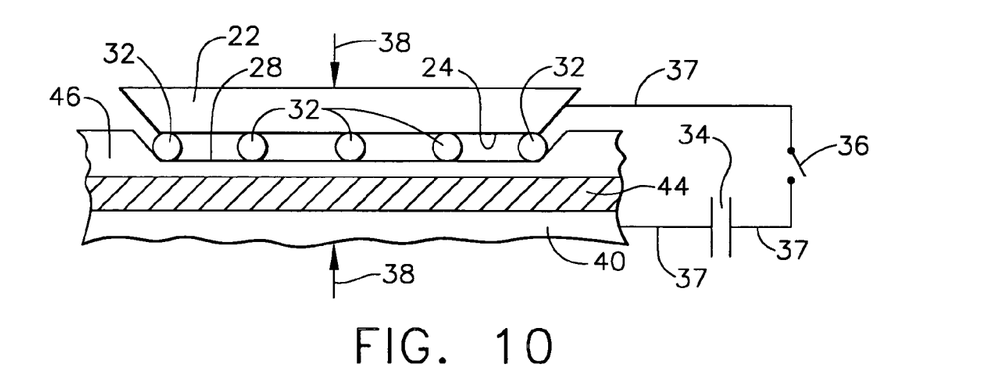
FIG. 10 is a view as in FIG. 8 with a replacement tip portion in position during practice of a form of the method of the present invention.
Figure 11:
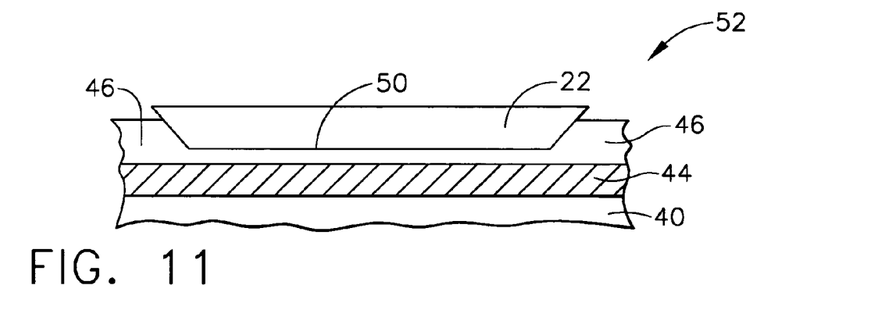
FIG. 11 is a view as in FIG. 10 after welding of the replacement tip portion to the blade tip.

Repair of such damage, according to one embodiment of the present invention includes removing the damaged portion 48 from rib 46 to provide the second interface surface 28 described in connection with FIG. 1 and shown in the fragmentary sectional views of FIGS. 5, 7, 8 and 10, identified above. The remaining portion of rib 46 then constituted the above-described second member 26, for example as represented in the fragmentary sectional views of FIGS. 7, 8 and 9. A first or replacement member 22 in the fragmentary sectional views of FIGS. 9, 10 and 11, made of the above described Ru 60 alloy and including a first interface surface 24, is welded at fusion-type weld 50 using the method described in connection with FIG. 1. The embodiment of the fragmentary sectional view of FIG. 10 shows several ignition members, for example Al free Ni wire segments, disposed between interface surfaces 24 and 28, the number selected depending on the length of interface surfaces 24 and 28. After welding, any excess portion of replacement member 22 can be removed appropriately using such well-known material removal methods as grinding, machining, etc. to blend with rib 46, to provide a welded article shown generally at 52 in the fragmentary sectional views of FIGS. 9 and 11. Article 52 includes the first and second members 22 and 26, fusion welded at weld 50 across a narrow heat affected zone free of a substantially continuous layer of brittle intermetallic compounds.

Another form of the present invention comprises including an interlayer or transition metal between first member 22 and second member 26. Such an interlayer can be used to act as a barrier or "getter" for such elements as Al that can diffuse at elevated temperatures, for example during gas turbine engine service operation, from second member 26 across weld 50 toward first member 22. As discussed above, the element Al at first member 22 at gas turbine engine operating temperatures can diffuse at the weld to form a substantially continuous layer of a brittle intermetallic compound that can result in cracking at the weld. In addition, such interlayer can bridge differences in mechanical or physical properties between the first and second members. An example of an alloy for such an interlayer is a substantially Al free Cr—Ni—Pd alloy.

Figure 12:
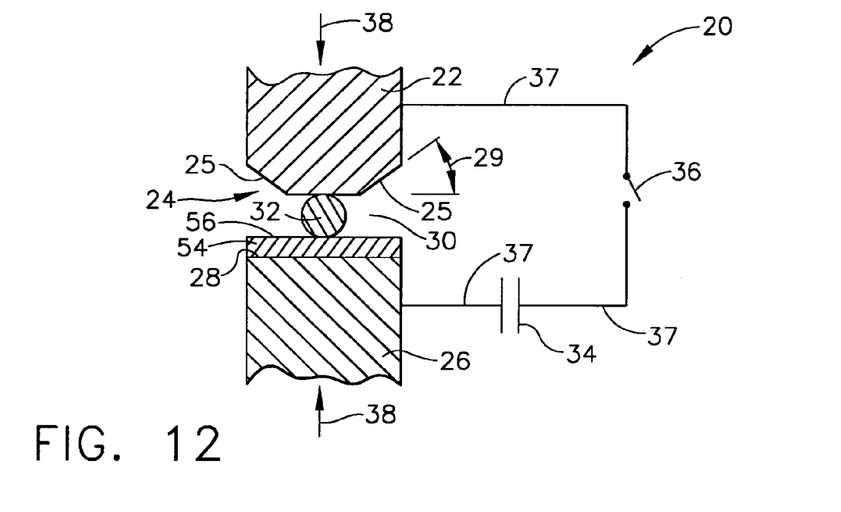
FIG. 12 is a diagrammatic, fragmentary view of the assembly as in FIG. 1 wherein the second member comprises at least one interlayer of a third metal or alloy to be welded with the first member.
Figure 13:
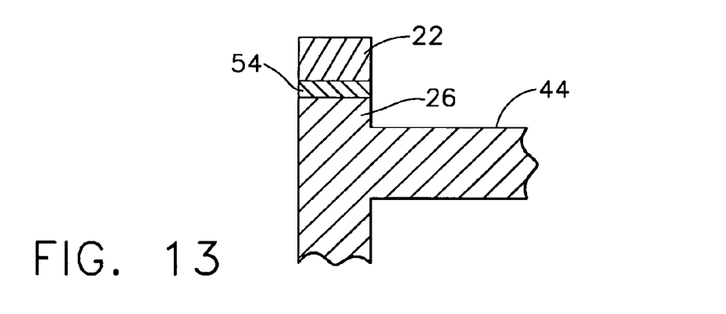
FIG. 13 is a sectional view of the structure of FIG. 7 with another form of a welded replacement tip portion including the interlayer shown in FIG. 12.

The diagrammatic fragmentary view of FIG. 12 is similar to the assembly and includes the same members and components as in the example of FIG. 1. However, FIG. 12 shows an assembly 20 wherein second member 26 includes a third metal or alloy member 54 bonded to surface 28. Member or metal 54 is an interlayer between first member 22 and second member 26 in the article formed as a result of practice of the method form of the present invention. Third or interface member or metal 54 includes a third interface surface 56 disposed across gap 30 in juxtaposition with interface surface 24 of first member 22. Repeat of the practice of the method described in connection with FIG. 1 resulted in the article shown in the fragmentary sectional view of FIG. 13. Such an article, for example the blade tip of FIGS. 2 and 11, included a welded replacement tip portion comprised of interlayer member 54 and first member 22 enhancing and repairing damage to the blade tip, as described above.

Still other embodiments of the present invention comprise fusion welding at least one first member based on the first metal as an overlay to at least one lateral surface of an article. For example such an overlay, similar to a coating, can be welded through practice of the method of the present invention to a selected portion of the surface of blade airfoil 40 shown in FIG. 2. It has been observed that during gas turbine engine service operation, selected surface portions of a turbine blade airfoil can experience more strenuous high temperature environmental damage than do other surface portions. An example of such conditions and surface damage is described in U.S. Pat. No. 6,042,880—Rigney et al. and shown in the perspective diagrammatic view of present FIG. 14 of a gas turbine engine blade 58 from the airfoil concave side. Typical discrete, local surface portion areas 60 and 62 more subject to damage are shown on the concave side of airfoil 40.

Figure 14:
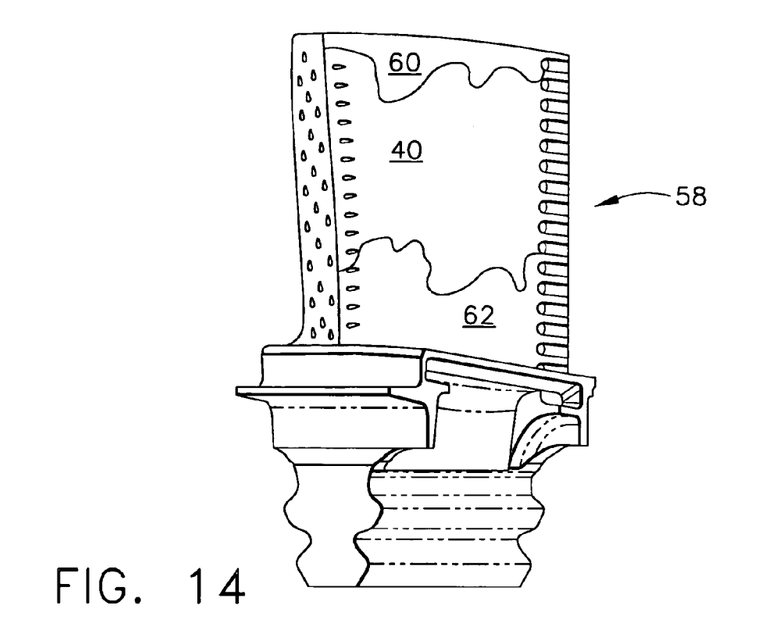
FIG. 14 is a perspective, diagrammatic view of a gas turbine engine blade from the concave side showing discrete, local surface areas subject to surface degradation in a thermal pattern as a result of service operation.
Figure 15:
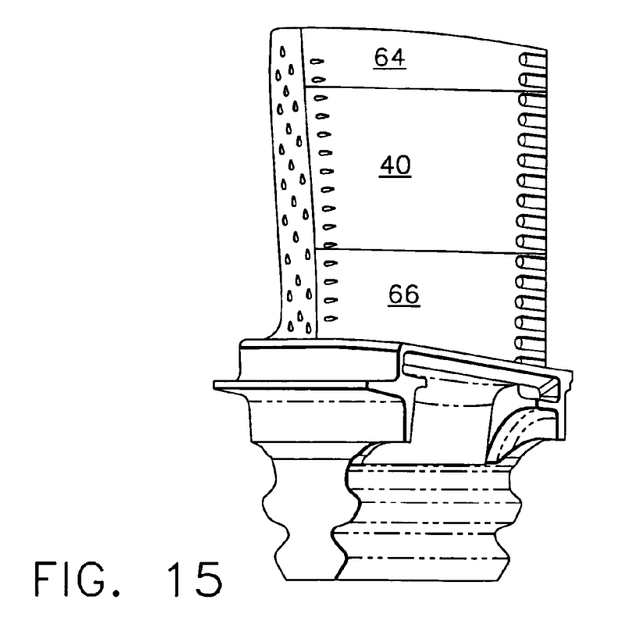
FIG. 15 is a fragmentary view of the blade of FIG. 14 showing enhancing material welded at the discrete, selected local surface areas of the blade airfoil.

Practice of the method form of the present invention, for example as shown and described in connection with FIGS. 1 and 12, can be used to weld such first members as 64 and 66 in the fragmentary view of FIG. 15, based on FIG. 14, to airfoil 40. Such first members, appropriately blended with adjacent airfoil surfaces, can enhance such discrete surface portion areas as 60 and 62, FIG. 14, prior to service operation or can repair such surface areas after service operation.

The present invention has been described in connection with specific examples, embodiments, structures, materials and methods. However, it should be understood that they are intended to be typical and representative of rather than in any way limiting on the scope of the present invention. Those skilled in the various arts involved, for example relating to turbine engines, to metallic materials, to metal joining and welding, and their combinations, will understand that the invention is capable of variations and modifications without departing from the scope of the appended claims.

What is claimed is:

1. A fusion welding method for welding a first member having a first interface surface with a second member having a second interface surface, the first and second interface surfaces being disposed in contact and fusion welded, wherein:
   the first member is made of a first metal free of at least one identified element that can form a continuous layer of a brittle intermetallic compound at the first interface surface;
   the second member is made of a second metal that includes the at least one identified element; and,
   energy is generated at the first and second interface surfaces in a combination of an amount and for a first time selected to be sufficient to heat the interface surfaces to a fusion welding temperature, the first time being less than a second time that enables formation at the fusion welding temperature of the continuous layer of the brittle intermetallic compound at the interface surfaces.

2. The method of claim 1 in which:
   the first metal is based on at least one element selected from the group consisting of Ru, Rh, Pd, and Pt;
   the second metal is a high temperature alloy based on at least one of Fe, Co, and Ni; and,
   the first time is less than about one second.

3. The method of claim 2 in which the second metal is a high temperature Ni base alloy in which the identified element is Al.

4. The method of claim 2 in which the first time is no greater than about 10 microseconds.

5. The method of claim 1 in which an interlayer metal that is free of the at least one identified element is bonded with the second interface surface of the second member prior to energy being generated, the interlayer metal including a third interlayer interface surface, the energy being generated at the first and third interface surfaces in the combination.

6. The method of claim 5 in which the interlayer metal is based on at least one element selected from the group consisting of Cr, Ni, Pd and their alloys and mixtures.

7. The method of claim 1 for repairing a damaged portion of a turbine engine blading member in which the second member is an airfoil that includes the damaged portion, and the first member is a replacement member including the first interface surface; wherein:
   the damaged portion is removed from the second member to provide the second interface surface;
   the replacement member is disposed so that the first interface surface is in contact with the second interface surface as the energy is generated to fusion weld the replacement member to the airfoil.

8. The method of claim 7 in which:
   the first metal is based on at least one element selected from the group consisting of Ru, Rh, Pd, and Pt;
   the second metal is a high temperature alloy based on at least one of Fe, Co, and Ni; and,
   the first time is less than about one second.

9. The method of claim 8 in which the damaged portion is at a radially outer tip portion of the airfoil.

10. The method of claim 9 in which an interlayer metal that is free of the at least one identified element is bonded with the second interface surface of the second member prior to energy being generated, the interlayer metal including a third interlayer interface surface for contact with the first interface surface, the energy being generated at the first and third interface surfaces in the combination.

11. The method of claim 8 in which the damaged portion is at least one discrete outer surface portion of the airfoil.

12. The method of claim 1 in the form of a percussion arc fusion welding method for welding a first member having a first interface surface with a second member having a second interface surface, the method comprising disposing the first and second interface surfaces in contact with an ignition member therebetween while passing electric current energy through the surfaces and the ignition member sufficient to vaporize the ignition member and to force together and fusion arc weld the interface surfaces, wherein:
   the first member is made of an electrically conductive first metal free of at least one identified element that can form a continuous layer of a brittle intermetallic compound at the first interface surface;
   the second member is made of an electrically conductive second metal that includes the at least one identified element;
   the first and second interface surfaces are disposed in juxtaposition across a gap therebetween;
   at least one ignition member made of a third electrically conductive metal free of the at least one identified element is disposed in the gap;
   a force is applied to press the first and second interface surfaces toward and into contact with the at least one ignition member to provide an electrically conductive path through the first member, the at least one ignition member, and the second member; and then,
   the first and second members are fusion welded at the first and second interface surfaces by passing through the electrically conductive path a flow of electric energy in an amount and for a first time sufficient to vaporize the at least one ignition member into a plasma jet that cleans the first and second interface surfaces and provides a medium for an electric arc to pass between and heat the first and second interface surfaces to a fusion welding temperature as the force moves the first and second interface surfaces into contact,
   the first time being less than a second time that enables formation at the fusion welding temperature of the continuous layer of the brittle intermetallic compound at the interface surfaces.

13. The method of claim 12 in which:
   the first metal is based on at least one element selected from the group consisting of Ru, Rh, Pd, and Pt;
   the second metal is a high temperature alloy based on at least one element selected from the group consisting of Fe, Co and Ni; and,
   the third metal is based on at least one of Fe, Co, Ni, Ru, Rh, Pd, and Pt.

14. The method of claim 12 in which the first time for the flow of electric energy is a brief burst of less than about one second.

15. The method of claim 12 in which the first time is no greater than about 10 microseconds.

16. The method of claim 12 in which an interlayer metal that is free of the at least one identified element is bonded with the second interface surface of the second member prior to energy being generated, the interlayer metal including a third interlayer interface surface, the energy being generated at the first and third interface surfaces in the combination.

17. The method of claim 16 in which the interlayer metal is a substantially Al free Cr—Ni—Pd alloy.

18. The method of claim 12 for repairing a damaged portion of a turbine engine blading member in which the second member is an airfoil that includes the damaged portion, and the first member is a replacement member including the first interface surface; wherein:

the damaged portion is removed from the second member to provide the second interface surface;

the replacement member is disposed so that the first interface surface is in contact with the second interface surface as the energy is generated to fusion weld the replacement member to the airfoil.

19. The method of claim 18 in which:

the first metal is based on at least one element selected from the group consisting of Ru, Rh, Pd, and Pt;

the second metal is a high temperature alloy based on at least one of Fe, Co, and the first time is less than about one second.

20. The method of claim 19 in which the damaged portion is at a radially outer tip portion of the airfoil.

21. The method of claim 19 in which the damaged portion is at least one discrete outer surface portion of the airfoil.

22. A welded article comprising:

a first member made of a first metal free of at least one identified element that can form a continuous layer of a brittle intermetallic compound with the first metal; and, a second member made of a second metal that includes the at least one identified element;

the first and second members being fusion welded at a weld that is free of the continuous layer of the brittle intermetallic compound.

23. The article of claim 22 in which the weld has a heat affected zone of no greater than about 10 mils.

24. The article of claim 22 in which:

the first metal is based on at least one element consisting of Ru, Rh, Pd, and Pt; and, the second metal is a high temperature alloy based on at least one element selected from the group consisting of Fe, Co, and Ni.

25. The article of claim 22 in the form of a turbine engine blading member in which:

the second member is a blade airfoil including a radially outer tip portion; and, the first member is fusion welded to the radially outer tip portion.

26. The article of claim 22 in which:

the second member is a blade airfoil including an outer surface; and, the first member is fusion welded to at least one discrete portion of the airfoil outer surface.

* * * * *